Jan. 9, 1968     H. A. CLEMENTS     3,362,514

ROTARY SYNCHRONOUS SELF-SHIFTING CLUTCH

Filed Aug. 16, 1965     2 Sheets-Sheet 2

United States Patent Office 3,362,514
Patented Jan. 9, 1968

3,362,514
ROTORY SYNCHRONOUS SELF-SHIFTING CLUTCH
Herbert A. Clements, Weybridge, England, assignor to S.S.S. Patents Limited, Acton Town, London, England
Filed Aug. 16, 1965, Ser. No. 479,823
3 Claims. (Cl. 192—110)

ABSTRACT OF THE DISCLOSURE

A toothed clutch in which driving and driven members mounted on input and output shafts respectively are located axially relative to one another by a spindle which at one end is integrally connected to one of the members and at the other end carries a disc with thrust bearing surfaces in sliding relationship with thrust bearing surfaces rotatable with the other member. The spindle has sufficient flexibility to accommodate permissible misalignment of the shaft. Oil ducts are situated adjacent the circumference of one of the shafts, and at least parts of the coacting bearing surfaces are radially beyond the ducts to enable oil to be supplied centrifugally to these parts when this shaft is rotating.

---

This invention relates to a toothed clutch constituting a flexible coupling, suitable for use e.g. between a steam or gas turbine and an alternator, to enable drive from the turbine to the alternator to be selectively established or interrupted.

In a conventional turbine-alternator set an axially rigid coupling is used to connect the turbine drivably to the alternator, and a single thrust bearing is used for the axial location of the entire shaft system, this bearing being located on the turbine shaft and cooperating with fixed axial abutments. When axial expansion of the shaft system occurs the alternator rotor moves axially in its journal bearings.

When a toothed type mechanical clutch, e.g. a synchronous self-shifting clutch is incorporated between the turbine and the alternator, it is usual for the alternator rotor shaft, as well as the turbine shaft, to be provided with a thrust bearing so that the alternator is positively located axially when rotating as a synchronous condenser with the clutch disengaged and the turbine at rest.

However, the thrust bearing on the alternator shaft constitutes a source of difficulty when the clutch is engaged and is transmitting torque from the turbine to the alternator, since the thrust bearings on the turbine and alternator shafts must both be of heavy construction to ensure that axial shaft expansion is taken up by forcing relative sliding motion to occur between the surfaces of the heavily loaded clutch teeth.

The invention provides a toothed clutch which when used between a turbine and an alternator obviates the need for a thrust bearing on the alternator shaft, and which is adapted to compensate in some degree for misalignment of the input and output shafts.

Figure 1:
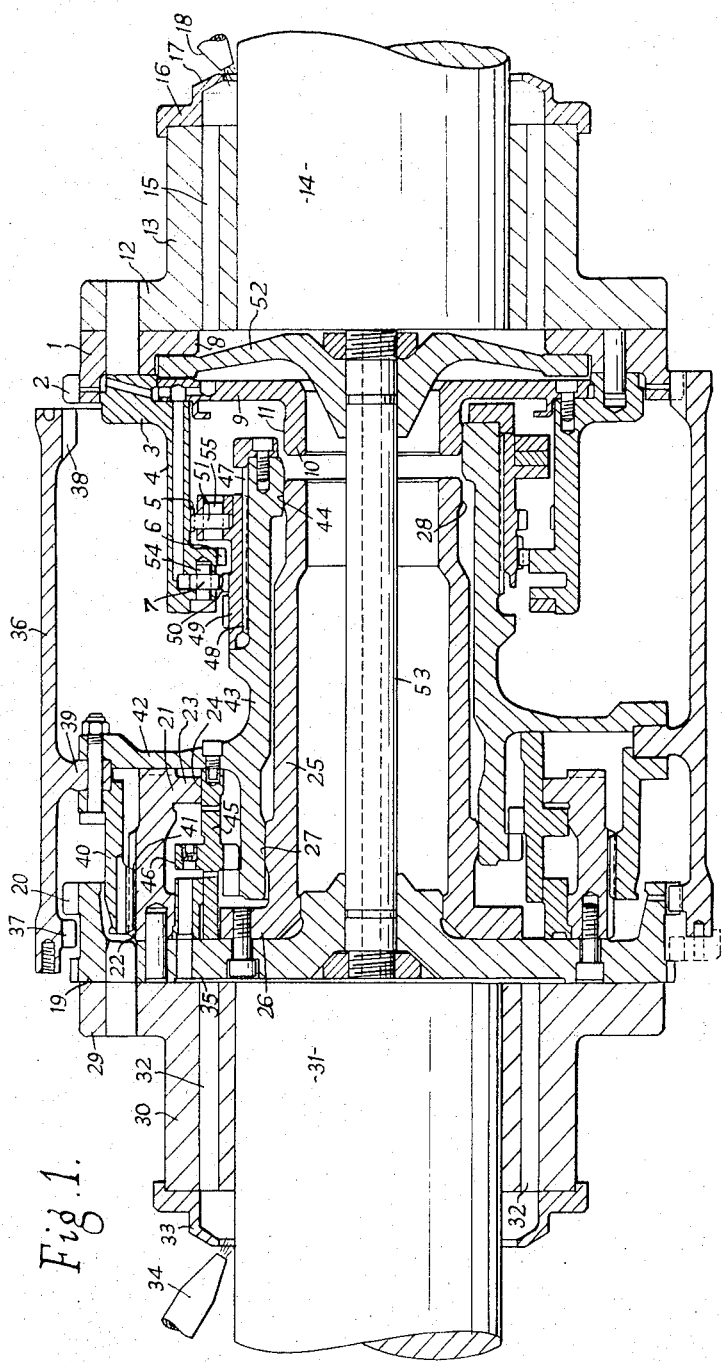
Figure 2:
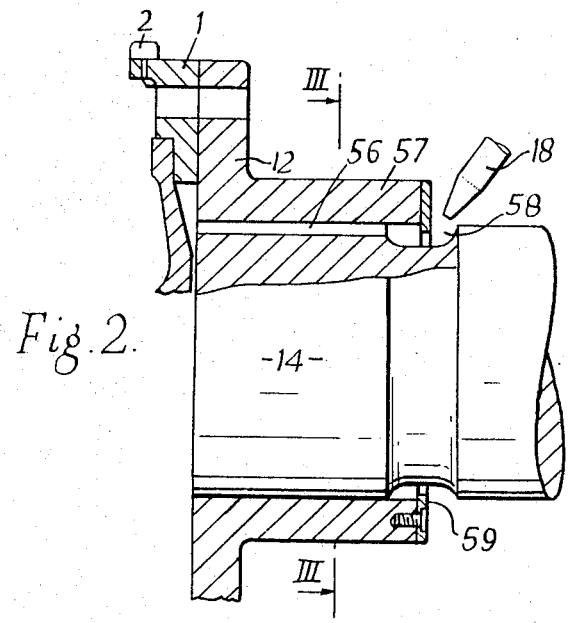
Figure 3:
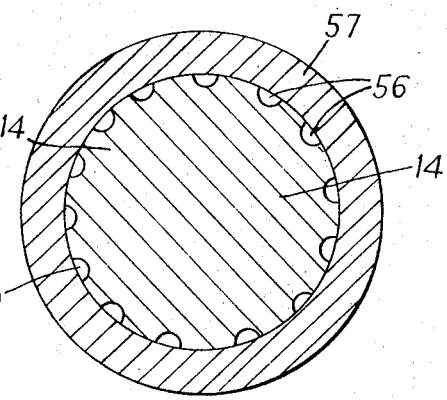

In the accompanying drawings,

FIG. 1 is a longitudinal sectional view of a synchronous self-shifting clutch embodying the invention, FIG. 2 is a detail view showing a modification of the arrangement of oil supply ducts for the thrust bearing surfaces, and FIG. 3 is a section on the line III—III of FIG. 2.

Referring to FIG. 1, one clutch member, hereinafter referred to as the first clutch member, comprises a ring 1 formed with external main clutch teeth 2 and bolted to a ring 3 formed with a cylindrical part 4 which is coaxial therewith and is provided with a ring of internal ratchet teeth 5 and a ring of internal auxiliary clutch teeth 6, and a ring of primary pawls 7. The ring 1 is formed with a radially inwardly projecting shallow annular flange 8 spaced axially from a ring 9 which is bolted concentrically to the ring 3 and projects radially inwardly and carries at its inner periphery an axially projecting cylindrical guide member 10 the free end of which is formed externally with a raised annular guide surface 11.

To the ring 1 is bolted a flange 12 formed on a hub 13 on the end of an alternator shaft 14, the hub 13 being formed with a ring of axial oil ducts 15 and being provided, at the end remote from the ring 1, with an oil collecting annulus 16 having a lip 17 which projects radially inwards towards the surface of the shaft. The oil ducts 15 open at this end into the space within the annulus 16 and at the other into the space radially within the flange 8 and ring 9. A fixed oil supply tube 18 is located so that oil discharged therefrom enters the space within the collecting annulus 16, from which the oil passes into the oil ducts 15 centrifugally feeding the thrust bearing surfaces hereinafter described.

The other clutch member, hereinafter referred to as the second clutch member, comprises a ring 19 formed with external main clutch teeth 20, and to the ring 19 is bolted an axially projecting cylindrical part 21 formed with external left-handed helical splines 22, and having at its free end a radially inwardly projecting flange 23 with a cylindrical inner surface 24. The second clutch member also includes a sleeve 25 formed at one end with a radially outwardly projecting annular flange 26 which is bolted to the ring 19, the sleeve 25 being formed at or near each end with external raised annular guide surfaces 27 and 28.

To the ring 19 is bolted a flange 29 formed on a hub 30 on the end of a turbine shaft 31, the hub 30 being formed with axial oil ducts 32 and an oil collecting annulus 33, and a fixed oil supply tube 34 is provided for supplying oil to the space within the annulus 33, the ducts 32 leading from the said space to an oil collecting chamber 35, from which the dashpot hereinafter mentioned is fed, and from which oil is fed through ducts to the working parts including the adjacent clutch teeth.

The clutch includes an intermediate member comprising a cylindrical outer sleeve 36 formed at or near each end with rings of internal main clutch teeth 37 and 38, and intermediate its ends, with a radially inwardly projecting annular flange 39 to the sides of which are bolted further parts 40 and 42. The part 40 is substantially cylindrical and projects axially towards the ring 19, and is formed with internal helical splines 41 engaged with the splines 22, and the part 42 is an annular flange that projects radially inwardly and carries a substantially cylindircal radially inner sleeve 43 projecting axially from the flange 42 in both directions. The part of sleeve 43 projecting towards the ring 19 has its inner surface in contact with and guided by the guide surface 27 and the part projecting towards the ring 1 is formed with an internal annular guide surface 44 which, with the clutch disengaged, is in contact with and is guided by the guide member 28.

To the flange 42 is bolted a cylindrical part 45 the outer surface of which is in sliding contact with the surface 24 of the flange 23, and the part 45 is formed with a radially outwardly projecting annular flange 46 which cooperates with the inner surface of the part 21 to form a dashpot.

The end of the part 43 adjacent the ring 1 is formed with external left-handed helical splines 47 with which are engaged internal helical splines 48 in a relay sleeve 49 which is formed with external auxiliary clutch teeth 50 and carries secondary pawls 51.

The thrust bearing referred to above comprises a disc 52 of light construction, the rim of which projects into the annular space formed between the ring 9 and the flange 8, and the sides of the rim constitute bearing surfaces in sliding contact with white metalled bearing surfaces on the sides of the ring 9 and flange 8. To enable the thrust bearing surfaces to be supplied with oil centrifugally when the shaft 14 is rotating, at least parts of the coacting surfaces of the bearing require to be radially beyond the outlets from the ducts 15. In the embodiment illustrated the bearing surfaces are wholly radially beyond the outlets from the oil ducts 15. The disc 52 is fixed on a spindle 53, of relatively small diameter and hence slightly flexible, which is carried by the ring 19, viz, by the second clutch member, and projects freely therefrom over substantially the whole axial length of the clutch. In this way the two clutch members and hence the input and output shafts 14 and 31 are located axially relative to one another, and the ability of the spindle 53 to flex slightly and/or of the disc 52 to deform enables the clutch to accommodate a small amount of misalignment between the shafts 14 and 31 without subjecting the load carrying surfaces of the thrust bearing to unequal and heavy concentration of side loading such as would otherwise arise from misalignment.

The primary pawls 7 have their noses pointing radially inward, and have control springs which urge them in a direction such that with the clutch disengaged they coact with the clutch teeth 50. Their weight distribution about their pivot pins 54 is such that above a predetermined angular speed of the first clutch member centrifugal force moves their noses out of contact with the auxiliary clutch teeth 50. The secondary pawls 51 have their noses pointing radially outwards, and their weight distribution about their pivot pins 55 is such that below a predetermined angular speed of the intermediate member 36 they are inert, but at or above this speed centrifugal force moves them to positions such that with the clutch disengaged their noses coact with the internal ratchet teeth 5. The purpose of the primary pawls 7 and secondary pawls 51 is described in United States Patent 3,093,226, and also in United States Patent 3,189,148, in which is also described with reference to FIG. 7 a relay type synchronous self-shifting clutch the operation of which is substantially similar to that of the clutch described above.

The shaft 31 of the turbine is provided with a thrust location bearing, and no thrust bearing is provided on the shaft 14 of the alternator, which is free to move axially within its bearings to accommodate expansion of the shaft system.

In FIGS. 2 and 3 the ducts for supplying oil to the surfaces of the thrust bearing are formed by a plurality of circumferentially spaced grooves 56 formed in the alternator shaft 14, and covered by a sleeve 57 projecting from the flange 13, oil being fed from the supply tube 18 to an annular groove 58 communicating with the grooves 56. The sleeve 57 projects over part of the groove 58 as shown, and has bolted to it a ring 59 serving as an oil guiding lip.

What is claimed is:

1. A toothed clutch comprising driving and driven members, and having the improvement that includes means for locating said members relatively to one another in both axial directions of the clutch while permitting relative rotation of said members in at least one direction when the clutch is disengaged, said locating means being substantially rigid in the axial sense and having sufficient flexibility therein to accommodate permissible misalignment of said members, connecting means integrally connecting said locating means to one of said members, thrust bearing surfaces rotatable with the other of said members, said locating means also including a thrust bearing member with thrust bearing surfaces in sliding coacting relationship with said first-mentioned thrust bearing surfaces.

2. A toothed clutch according to claim 1, wherein said locating means comprise a disc, constituting said thrust bearing member, and a spindle carrying said disc and integrally connected to said one of said members.

3. A toothed clutch according to claim 1, including input and output shafts on which said driving and driven members are respectively mounted, means defining oil feed ducts situated adjacent the circumference of at least one of said shafts, at least parts of said coacting thrust bearing surfaces being radially beyond said ducts whereby to enable oil to be supplied centrifugally to said parts when said one shaft is rotating.

References Cited

UNITED STATES PATENTS

| | | | |
|---|---|---|---|
| 934,043 | 9/1909 | Coffin | 192—110 |
| 3,093,007 | 6/1963 | Aebersold | 192—54 X |
| 3,154,181 | 10/1964 | Sigg | 192—67 |

DONLEY J. STOCKING, *Primary Examiner.*

ARTHUR T. McKEON, *Examiner.*